(12) United States Patent
LaVallee et al.

(10) Patent No.: US 12,508,834 B2
(45) Date of Patent: Dec. 30, 2025

(54) MULTI-COLORED DECORATIVE COMPONENT AND METHOD

(71) Applicant: Lacks Enterprises, Inc., Grand Rapids, MI (US)

(72) Inventors: Michael LaVallee, Grand Rapids, MI (US); Alan Fanta, Grand Rapids, MI (US); Dave Baumgart, Grand Rapids, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 636 days.

(21) Appl. No.: 17/752,090

(22) Filed: May 24, 2022

(65) Prior Publication Data

US 2022/0379655 A1   Dec. 1, 2022

Related U.S. Application Data

(60) Provisional application No. 63/192,871, filed on May 25, 2021.

(51) Int. Cl.
*B44F 1/08* (2006.01)
*B32B 3/10* (2006.01)
(Continued)

(52) U.S. Cl.
CPC ............ *B44F 1/08* (2013.01); *B32B 3/10* (2013.01); *B32B 3/266* (2013.01); *B32B 3/30* (2013.01);
(Continued)

(58) Field of Classification Search
CPC .... B44F 1/08; B44F 1/045; B44F 1/02; B44C 1/228; B44C 3/005; C23C 14/025; C23C 14/20; C23C 14/5873; C23C 16/0281; C23C 16/06; C23C 16/50; C23C 16/56; C23C 28/02; C23C 28/023; C23C 30/00; C23C 30/005; C25D 5/022; C25D 5/48; C25D 5/56; C25D 5/627; C25D 5/14; Y10T 428/12847; Y10T 428/12854; Y10T 428/12569; Y10T 428/12556;
(Continued)

(56) References Cited

U.S. PATENT DOCUMENTS

2012/0225255 A1    9/2012  Reeder
2018/0044808 A1*   2/2018  Kieslich ................. C25D 5/625
(Continued)

*Primary Examiner* — Michael E. La Villa
(74) *Attorney, Agent, or Firm* — Dickinson Wright PLLC (57) ABSTRACT

A decorative component includes a plurality of metal finish layers deposited over a substrate and a plurality of sublayers. The outermost metal finish layer is selectively deposited or removed to define one or more recesses to create different appearances of the component. The outer metal layer may undergo laser ablation to remove at least a portion of the outer layer while still exposing the outer layer in the area of removed material. The recess may extend fully through the outer layer to expose the underlying metal finish layer, and/or the recess may have a sloped bottom surface to define a gradient appearance. The outer layer may be applied over a mask that is applied to the underlying layer, such that the outer layer is selectively applied. The outer layer may be removed to expose the underlying finish layer without exposing a nickel sublayer and without requiring a top coat.

21 Claims, 10 Drawing Sheets

(51) Int. Cl.
| | |
|---|---|
| B32B 3/26 | (2006.01) |
| B32B 3/30 | (2006.01) |
| B32B 15/01 | (2006.01) |
| B32B 15/04 | (2006.01) |
| B32B 15/20 | (2006.01) |
| B44C 1/22 | (2006.01) |
| B44C 3/00 | (2006.01) |
| B44F 1/04 | (2006.01) |
| C23C 14/02 | (2006.01) |
| C23C 14/20 | (2006.01) |
| C23C 14/58 | (2006.01) |
| C23C 16/02 | (2006.01) |
| C23C 16/06 | (2006.01) |
| C23C 16/50 | (2006.01) |
| C23C 16/56 | (2006.01) |
| C23C 28/02 | (2006.01) |
| C25D 3/06 | (2006.01) |
| C25D 5/00 | (2006.01) |
| C25D 5/02 | (2006.01) |
| C25D 5/48 | (2006.01) |
| C25D 5/56 | (2006.01) |
| B44F 1/02 | (2006.01) |
| C25D 5/14 | (2006.01) |

(52) U.S. Cl.
CPC ............ *B32B 15/01* (2013.01); *B32B 15/018* (2013.01); *B32B 15/04* (2013.01); *B32B 15/043* (2013.01); *B32B 15/20* (2013.01); *B44C 1/228* (2013.01); *B44C 3/005* (2013.01); *B44F 1/045* (2013.01); *C23C 14/025* (2013.01); *C23C 14/20* (2013.01); *C23C 14/5873* (2013.01); *C23C 16/0281* (2013.01); *C23C 16/06* (2013.01); *C23C 16/50* (2013.01); *C23C 16/56* (2013.01); *C23C 28/02* (2013.01); *C23C 28/023* (2013.01); *C25D 3/06* (2013.01); *C25D 5/022* (2013.01); *C25D 5/48* (2013.01); *C25D 5/56* (2013.01); *C25D 5/627* (2020.08); *B44F 1/02* (2013.01); *C25D 5/14* (2013.01); *Y10T 428/12361* (2015.01); *Y10T 428/12368* (2015.01); *Y10T 428/12389* (2015.01); *Y10T 428/12556* (2015.01); *Y10T 428/12569* (2015.01); *Y10T 428/12847* (2015.01); *Y10T 428/12854* (2015.01); *Y10T 428/12875* (2015.01); *Y10T 428/12882* (2015.01); *Y10T 428/12903* (2015.01); *Y10T 428/1291* (2015.01); *Y10T 428/12917* (2015.01); *Y10T 428/12924* (2015.01); *Y10T 428/12993* (2015.01)

(58) Field of Classification Search
CPC ..... Y10T 428/12993; Y10T 428/12361; Y10T 428/12368; Y10T 428/12875; Y10T 428/12882; Y10T 428/12903; Y10T 428/1291; Y10T 428/12917; Y10T 428/12924; Y10T 428/12389; B32B 3/10; B32B 3/30; B32B 3/266; B32B 15/01; B32B 15/018; B32B 15/04; B32B 15/043; B32B 15/20
See application file for complete search history.

(56) References Cited

U.S. PATENT DOCUMENTS

| | | |
|---|---|---|
| 2019/0210062 A1 | 7/2019 | Moh et al. |
| 2020/0071844 A1 | 3/2020 | LaVallee |
| 2020/0109482 A1 | 4/2020 | LaVallee |
| 2021/0079549 A1 | 3/2021 | Kieslich |

* cited by examiner

MULTI-COLORED DECORATIVE COMPONENT AND METHOD

CROSS-REFERENCE TO RELATED APPLICATIONS

The present application claims priority to previously filed U.S. Provisional Patent Application No. 63/192,871, filed May 25, 2021, the entire content of which is hereby incorporated by reference in its entirety.

TECHNICAL FIELD

The present disclosure is directed to multi-colored metal plated workpieces, and a method for creating multi-colored metal plated workpieces.

BACKGROUND OF THE DISCLOSURE

Plated decorative chrome finishes have been commercially available for various products in the automotive, appliance, consumer electronics, and other markets for many years. As technologies and consumer tastes have matured, the desire for more complicated parts and designs has evolved. It has therefore become more desirable to incorporate multiple finishes onto a single part. The visual aesthetic of multiple finishes is more attractive to the consumer and allows designers additional options to create new and more complex designs.

Typically, metal finishes created from electroplating solutions or vapor deposition techniques have only a single metal finish, with a single finish layer of metal material overlaid on a plateable substrate and/or other base layers.

Multi colored finishes can be created in various ways. One method for creating a multi-colored finish or appearance includes employing both plateable and non-plateable plastic substrates, which are combined to produce a colored plastic and metal plated combination design. Another method for creating a multi-colored design, includes creating multi-colored metal finishes by assembling different separate colored metal finished pieces onto a common carrier member.

It has also been demonstrated that different metal finishes can be deposited onto electrically isolated zones of a workpiece by electrodeposition. Similarly, different metal finishes can be achieved by selectively masking metallized parts in a vapor deposition chamber.

Furthermore, multi-colored work pieces have been achieved by mechanically removing parts of the relatively thin chrome finish layer on a decoratively chrome plated part with abrasive techniques such as "brushing." In this approach, abrasive brushes remove channels of the chrome top layer, thereby leaving rows of exposed nickel (which was disposed below the chrome finish layer) and residual chrome. While this result may be aesthetically pleasing, this technique is limited in use, because it requires the use of a transparent topcoat to seal the finish. Otherwise, the exposed nickel layer is subject to excessive corrosion and is therefore not able to pass automotive specifications.

To address the issue of the exposed nickel layer, one approach involves employing laser ablation over a thick chrome surface (thicker than the relative thin chrome finish layer described above), which can impart channels into the surface, thereby replicating the look of a brushed surface. In this approach, the nickel layer is not exposed, as a thin layer of the chrome is left in the location of the channels. This approach creates the parallel surface structure similar to a brushed look, but without the use of a topcoat because the nickel is not exposed. However, the result does not have the color contrast that the exposed nickel would otherwise bring to the appearance of the finish.

In view of the above, there is a need for improved methods of creating multi colored metal surface finishes for decorative components.

SUMMARY OF THE DISCLOSURE

It is an aspect of the disclosure to provide a multi-colored decorative component that can be made without mechanical abrasion or exposing a nickel layer requiring a protective topcoat.

In one aspect, a method of creating a decorative component having multiple colors is provided. The method includes: providing a plateable substrate; depositing a plurality of sub-layers on the plateable substrate; depositing a first decorative metal layer on the plurality of sub-layers; depositing a second decorative metal layer on the first decorative metal layer, wherein the second decorative metal layer defines an outermost surface of the decorative component, the outermost surface having a first appearance; defining a first recess in the second metal layer that defines a second appearance. In one aspect, the first recess extends fully through the second metal layer and exposes the first metal layer underlying the second metal layer.

In one aspect, the substrate is a plastic substrate formed of a plateable resin.

In another aspect, a decorative component is provided. The decorative component includes: a substrate formed from plateable material; a plurality of metal sub-layers deposited on the substrate; a first decorative metal layer deposited on the plurality of metal sub layers, the first decorative metal layer having a first color; a second decorative metal layer deposited on the first decorative metal layer, the second decorative metal layer having a second color that is different than the first color, wherein the second decorative metal layer defines an outermost surface of the decorative component; a first recess formed in the second decorative metal layer, the first recess having a first depth relative to the outermost surface and exposing the first decorative metal layer; wherein the outermost surface of the second decorative metal layer has a first appearance, and the first recess defines a second appearance that is different than the first appearance. In one aspect, multiple recesses are formed into the component at different depths, thereby exposing different colors, finishes, and/or appearances in different areas of the part to define various patterns, shapes, logos, or the like with a multi-color and/or multi-gloss finish. In one aspect, the second layer is not added in certain areas rather than being removed from the area where the first layer is to be exposed.

In one aspect, the substrate is a plastic substrate formed of a plateable resin.

In one aspect, a decorative component includes: a substrate formed from plateable material; a plurality of metal sub-layers deposited on the substrate; a first decorative metal layer deposited on the plurality of metal sub layers, the first decorative metal layer having a first color; a second decorative metal layer deposited on the first decorative metal layer, the second decorative metal layer having a second color that is different than the first color, wherein the second decorative metal layer defines an outermost surface of the decorative component; a first recess extending into the second decorative metal layer; wherein the outermost surface of the second decorative metal layer has a first appearance; wherein the first recess has a variable depth extending into the second metal layer and includes a sloped bottom surface defined by remaining material of the second metal layer, wherein a thickness of the remaining material of the second metal layer varies across the first recess to define a gradient surface appearance across the first recess that is different than the first appearance of the outermost surface of the second decorative metal layer.

In one aspect, the substrate is a plastic substrate formed of a plateable resin.

BRIEF DESCRIPTION OF THE DRAWINGS

FIGS. 4A1-4C1 illustrate photo representations of FIGS. 4A-4C;

FIGS. 5A1-5B1 illustrate photo representations of FIGS. 5A-5B;

DETAILED DESCRIPTION OF THE DISCLOSURE

With reference to the figures, the present disclosure is directed to a method for creating a decorative component 100 and/or 200 having multicolored metal surfaces. As described in further detail below, the multicolored metal surfaces can be created via the use of laser ablation, according to one aspect. The resulting component 100 and/or 200 includes multiple metal surfaces stacked on top of one another, with certain portions of one or more of the multiple metal surfaces removed via laser ablation to expose different ones of the metal layers and create a multicolored surface finish. The laser ablation process may be used to create simple or complex lines, and the size and depth of the laser may be tailored according to the pattern, shape, or appearance that is desired.

The laser ablation is used to selectively remove one or more of the decorative layers that are applied to a plateable substrate to produce a surface finish having at least two different colors. The laser may be used to create simple lines (such as in the case of creating a brushed finish) or more complicated patterns, including reproductions of photographic images. By selecting different sizes and penetration depths of the laser, multiple colors and/or finishes may be seen by the viewer. In one aspect, the depth of ablation may vary gradually, such as along a slope or taper through a given material thickness, within a given area or region to create a gradient effect.

Figure 1:
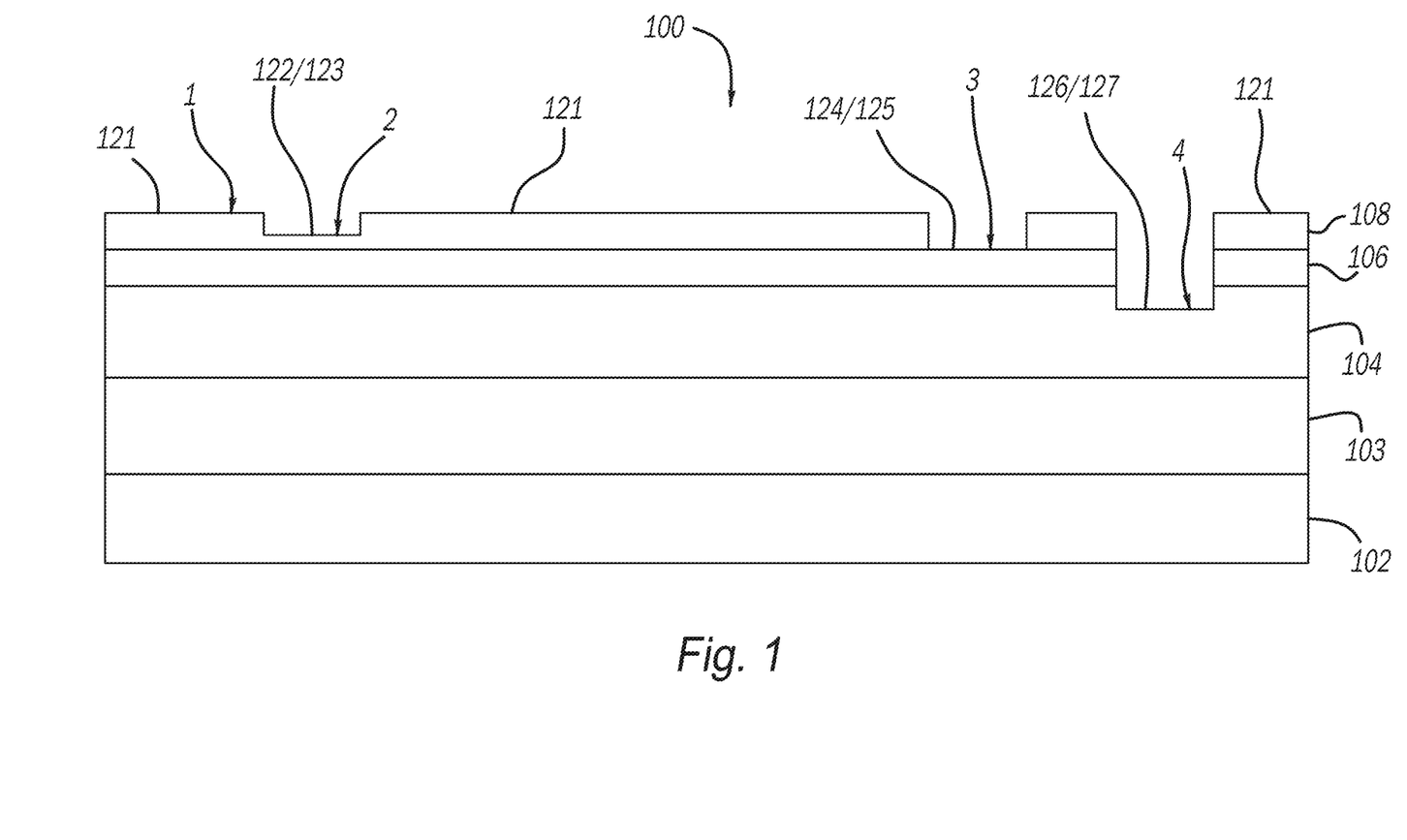
FIG. 1 is a schematic cross-sectional view of a decorative component according to an aspect of the disclosure.

With reference to FIG. 1, according to an aspect, the component 100 may be formed via an electroplating process followed by laser ablation. The process of electroplating is known, and will not be described in exhaustive detail herein. Initially, a plateable substrate 102 formed of plateable material, such as via injection molding of PC+ABS, is provided. The substrate 102, being plateable, is thereafter subject to electrodeposition, in which multiple layers are deposited one on top of the other. The layers may include a bright acid copper layer 103 that is deposited over the plateable substrate 102. One or more nickel layers 106 are deposited over the copper layer 103. A first chrome layer 106, such as bright trivalent chrome, is deposited on the nickel layer 106. A second chrome layer 108, such as dark trivalent chrome, is deposited on the first chrome layer 106.

It will be appreciated that additional and different layers may be deposited. For example, a third chrome layer may be deposited on the second chrome layer 108. In such a case, the outermost layer that is deposited would be treated similarly to the second layer 108 described herein, which, for the purposes of this disclosure will be described as the outermost layer. Other metal materials may also be used for the outermost layer, including other types of chrome.

The component 100 may be formed as a single plateable injection molded substrate 102 that is thereafter electroplated over its entire surface. However, other forms of the workpiece resulting in the component 100 may also be used. For example, the component 100 may be formed by a workpiece having both the plateable substrate 102 as well as a non-plateable portion. The plateable substrate 102 may include multiple electrically isolated portions to create a different first chrome layer 106 in one section relative to another section of the same base substrate 102. Various methods of electrically isolating one section of the substrate 102 from another may be used, and will not be described in further detail.

The plateable substrate 102 may also be other materials. For example, the plateable substrate 102 under the nickel and/or copper layers can be aluminum or other metals, or can be an electroplated plastic workpiece as described above.

In the case of electroplating, the chrome layers 106, 108 are deposited from a trivalent chromium electroplating bath or plating solution. As set forth above, the chrome of the chrome layers 106, 108 may be either bright or dark. The dark layer may be darkened with a darkening agent.

After plating the first chrome layer 106, a subsequent chrome layer such as the second chrome layer 108 is then deposited over the first chrome layer 108. As illustrated in FIG. 1, the second chrome layer 108 may be a dark chrome, and the first chrome layer 106 may be a bright chrome. However, it will be appreciated that dark, light, bright, etc. chromes may be deposited in a variety of orders, depending on the desired final finish for the decorative component 100. The chrome layers 106, 108 may also be varied to create different gloss levels via electroplating, such as a satin finish or matte finish.

According to an aspect, it is possible for the final or second chrome layer 108 to be deposited from a hexavalent chromium bath or solution. This type of chromium bath is suitable for a final, outermost layer, but not for lower layers, because hexavalent chromium finishes passivate almost instantaneously, thereby rendering the surface unfit for further layers to be deposited thereon.

In addition to the use of electroplating to deposit the first chrome layer 106 and the second chrome layer 108, other methods for chrome deposition may be used, as further described below. It will be appreciated that various ones of these methods may be combined with other aspects of this disclosure and that specific illustrative embodiments shall not limit the use of one variant method step to those other steps specifically tied to such method, unless otherwise noted.

In one aspect, the first chrome layer 106 may be chrome or a chrome alloy, and may be electroplated over the nickel layer 104 in the manner described above. The second layer 108 may then be deposited by vapor deposition, and the second layer may be a different metal or metal alloy. Vapor deposition may be in the form of PVD, PACVD, or PECVD. It will be appreciated that other vapor deposition techniques may also be used.

Similarly, the first layer 106 may also be deposited using a vapor deposition technique and may be another metal or metal alloy. Accordingly, both layers 106 and 108 may be deposited by vapor deposition and/or electroplating.

In the above-described deposition techniques, the first layer 106 and second layer 108 are different colors. Whichever color or material is used for the first layer 106, the first layer 106 cannot form a passivate that will impede the adhesion of subsequent layers that are laid on top of it. Accordingly, the second layer 108 may not form a passivate that will impede the deposition of a third layer, for example. However, if the second layer 108 is intended to be the outermost layer, then the second layer may form a passivate (for example, the hexavalent chrome described below may be used as the second layer 108 if no additional layers are intended).

In one aspect, the layers and/or material of the layers are based on chrome and chrome alloys in the case of automotive applications, because these types of finishes are capable of passing industry test specifications for both interior and exterior uses.

In view of the above, the component 100 may be constructed to include the multiple colored layers as described above in one or more of the methods described above, thereby resulting in a pre-finished or intermediate form in which the layers have been applied, but prior to the laser ablation for removing portions of one or more of the deposited layers.

Once the substrate 102 has been coated with the various layers, including metal layers of various colors, it is thereafter possible to selectively remove different amounts of the outer finish layer (second layer 108 in the illustration of FIG. 1), and it is further possible to remove additional layers (also at different amounts) deposited underneath the outer finish layer 108. Layers may be fully removed with regard to depth, or may be partially removed to leave a portion of the layer remaining below the area that is removed. Layer removal maybe performed via laser ablation and, as described previously, the properties of the laser may be tailored depending on the needs of the design. For example, the path, spot size, laser power, and amount of time that the laser is applied may be varied to specifically control the amount of material that is removed and the pattern and shape of such removal. Similarly, the depth of the laser may also be varied.

In one aspect, the laser may impart lines, circles, or any other geometric shape into metal material of the various layers 104, 106, 108. Additionally, the spot of the laser can be controlled down to a few microns, and the depth of the laser can similarly be finely controlled. Accordingly, it is possible to create intricate patterns and shapes beyond traditional lines and geometric shapes. For example, specific graphic symbols, such as logos, designs, and photographic images can be etched into the surface of the component 100 via the laser ablation. The depth of a particular removed area may be made constant to create a consistent appearance in the given area, or the depth of the laser may be varied as it moves, to create a gradual or tapered amount of material that is removed relative to the lateral extension of the material.

Due to the stack of material in layers over the substrate 102 to create the component 100, the depth of the laser can be controlled to determine the color or appearance at effectively any location on the part by effectively choosing which of the layers to expose. Thus, with multiple layers of materials of different colors, various colors can be combined and displayed adjacent each other. The laser ablation and controlled depth of material removal can be used to create pixel-like representations and images, where a combination of colors that when viewed from a distance combine to define a specific image.

Additionally, the particular stackup of metal layers and colors, as well as the translucent nature of some materials, can allow for different appearance depending on how much of the exposed layer remains relative to adjacent areas of the same exposed material. For example, if a small portion of the depth of the outermost layer 108 is removed in one area, and a greater portion of the outermost layer 108 is removed in another area, the appearance of the outermost layer 108 may be different in these areas even though the layer 108 was not fully removed to expose the underlying layer 106. Thus, the number of surface appearances is not limited simply by the number of layers and which of the layers are exposed or not.

The example of FIG. 1 illustrates, in one aspect, how four different colors can be displayed from the same component 100 based on the depth of removed material. However, as described above, even more appearance may be possible from this representation. It will be appreciated that the example of FIG. 1 is illustrative, and that various other relative thickness of materials and stackup orders, as well as the depth of removed material, may be altered.

The various colors that are visible and/or displayed on the component 100 are represented as regions/colors 1, 2, 3, and 4 in FIG. 1. The component 100 of FIG. 1 is a part that has been plated with dual chrome finishes, with dark trivalent chrome 108 layered over bright trivalent chrome. As described previously, other material types or colors could also be used. The outermost layer 108, for example, could be hexavalent chrome.

With further reference to the example of FIG. 1, the substrate 102 may be a plaque molded from a plateable grade of ABS resin, which may be subjected to a standard plating on plastic by a process that is known in the art. The substrate 102 may also be another plateable material. For the purposes of discussion, but not limiting, the substrate 102 may be referred to as a plastic substrate. The plastic substrate 102 may be plated initially with bright acid copper at layer 103, followed by semi-bright nickel, bright nickel, and microporous nickel at layer or layers 104 (it will be appreciated that the nickel layer or layers are shown as a single section in the schematic, but that this section may itself include multiple layers). Bright trivalent chrome 106 is plated over the microporous nickel layer. Finally, dark trivalent chrome 108 is deposited over the bright trivalent chrome 106.

The layers described in the above example may have varying thicknesses. The specific thicknesses of such a plating process are selected according to OEM specifications. According to an aspect, the decorative chrome layers 106 and 108 are typically very thin, around 0.2 microns. The overall thickness of the entire plated stack may be about 40 microns, for reference. Thus, it will be appreciated that the illustrated schematic is not to scale, and the thickness of the layers relative to each as illustrated is exaggerated for ease of illustration.

These relatively thin chrome layers 106, 108 are therefore well suited to laser ablation. The thin chrome layers 106, 108 are capable of being removed through laser ablation without damaging the substrate 102 or other underlying layers, thereby preserving the integrity of the component 100 through the laser ablation process.

With further reference to FIG. 1, various relative depths of the recessed or channels created by the laser are illustrated. The spot size or width of the laser in the illustration of FIG. 1 is shown as being generally constant. In one aspect, the spot size of the laser and the minimum width of removed material during laser ablation (for example in a single spot or a straight line) may be the same across the component 100. However, different spot sizes may be used on different areas of the component. In one aspect, the laser may be adjusted between ablation steps. In another aspect, the laser may be held constant, and the part may be moved to a different laser having different settings.

As shown at region/color 1, a full thickness of the second chrome layer 108 (dark trivalent chrome) is illustrated. The resulting appearance corresponding to the color 1 is that of the dark trivalent chrome used for the second chrome layer 108. The area of the component 100 that has not been laser ablated may have color 1, and may also be referred to as a first area 121. The first area 121, in this example, is therefore a dark chrome color. The first area, in one aspect, may have a shiny or glossy finish.

As shown at region/color 2, a portion of the outermost, second chrome layer 108 has been partially, but not fully, removed. A first depth of material of layer 108 has been removed, thereby defining a first recess or recessed section 122. Areas of the component 100 having a corresponding first recessed section 122 may be referred to as a second area 123. The region/color 2 of second area 123, in this example, is lighter than first area 121 and region/color 1. In this area 123, a thin section of the dark chrome layer 108 remains, which appears different than a full thickness of the dark chrome layer 108. It will be appreciate the various colors, regions, and/or areas described in this example need not be continuous, and may for example be located in separated areas at different locations across the part.

As shown at region/color 3, the dark chrome layer 108 is completely ablated and removed. At this location, a second depth of material of layer 108 is removed, being greater than the first depth of material that was removed to produce color 2. Accordingly, a second recessed section 124 is defined. Areas of the component 100 having the second recessed section 124 may be referred to as a third area 125. The color 2 of the third area 125 may be bright chrome, corresponding to the layer 106 that is exposed due to the full ablation of the overlaying layer 108. The bright chrome 106 is therefore exposed and visible, displaying a color that is different than both color 1 and color 2.

As shown at region/color 3, the depth of the ablation is further increased, and both the first layer 106 and second layer 108 are completely removed, and the underlying nickel layer 104 is exposed. Third recessed section 126 is defined, having a third depth of removed material that is greater than the second depth. Accordingly, a fourth area 127 is defined correspond to the area having the third recessed section 126. As shown in FIG. 1, a portion of the nickel layer has been removed, but not all of the nickel layer is removed.

It will be appreciated that other depths within each layer may also be removed to create a different appearance. For example, first layer 106 is illustrated as being exposed at area 125 via removal of layer 108, or completely removed to expose area 127 of the nickel layer 104, but layer 106 may also be partially removed, at a depth greater than that of area 125 but less than at area 127, such that a portion of layer 106 remains (similar to the portion of layer 108 that remains at area 123, or the portion of layer 104 that remains at area 127).

Figure 2:
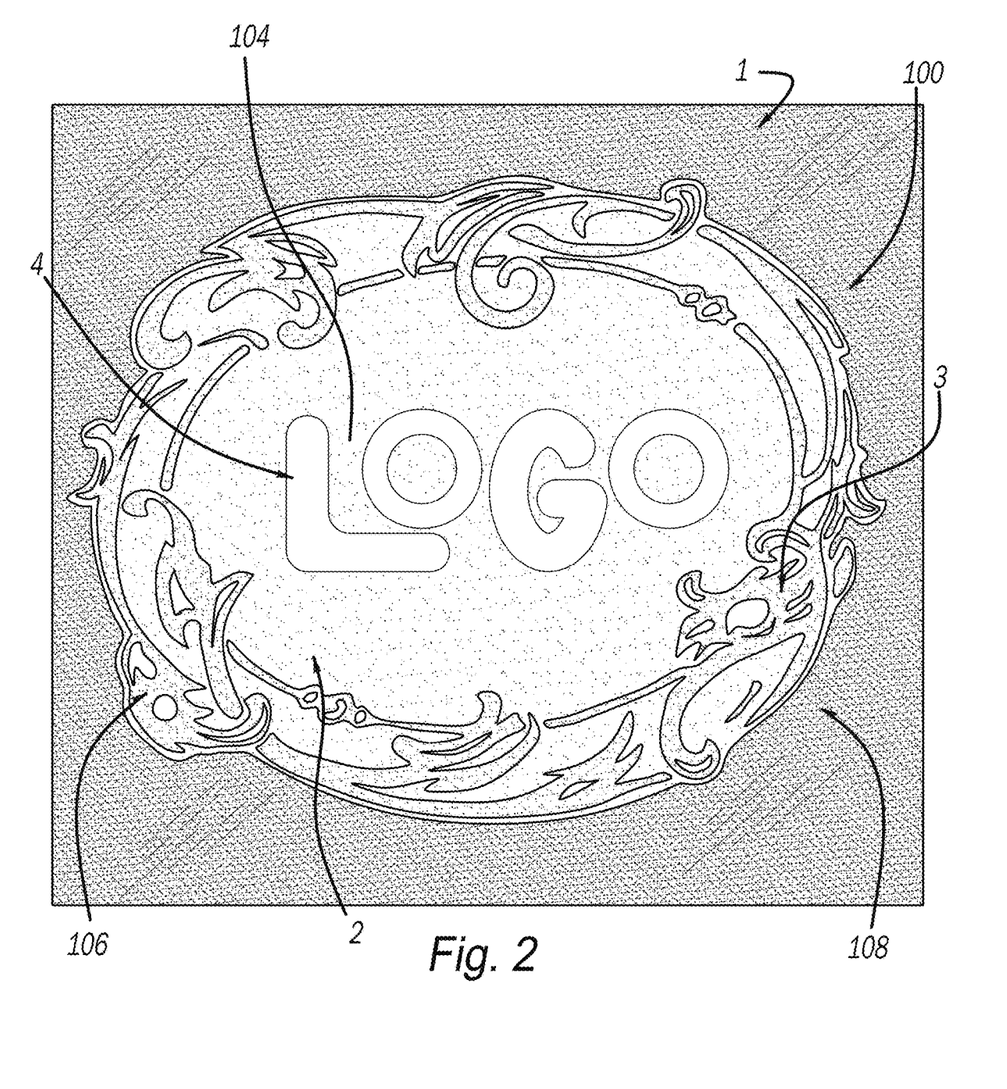
FIG. 2 illustrates a decorative component formed according to an aspect of the disclosure.

FIG. 2 illustrates a component 100 having a surface finish created according to the above-described arrangement. Colors 1, 2, 3, and 4 are identified in the illustrated component 100 of FIG. 2.

FIG. 2 illustrates an aspect of the above described method related to the reflectiveness of the colors. Due to the ablation process, the materials subject to ablation become roughened relative to the typical bright and reflective appearances occurring from a plating process. Thus each of the areas exposed to the laser may no longer be "bright." Color 1, however, will remain bright, as the areas corresponding to color 1 were not subjected to laser ablation. The other colors 2, 3, 4 and corresponding areas are less reflective due to the surfaces being roughened from the laser.

FIG. 2 illustrates a design of component 100, with dark chrome at color 1, appearing as a very dark and reflective surface of layer 108. A reflection is visible at the bottom of the picture in the area corresponding to color 1. Color 2 is likewise dark, but not reflective. This area is still relatively dark compared to colors 3 and 4, but less dark relative to color 1. Color 2 corresponds to dark chrome that was only partially ablated, such that the reflective and glossy finish is removed, creating a different appearance from the same material of layer 108. Color 3 is lighter than color 2, and is not reflective. Color 3 corresponds to the bright chrome of layer 106 that is exposed when the dark chrome is fully ablated, and is not reflective. Color 4 corresponds to exposed nickel from layer 104, with the bright chrome of layer 106 (and the layer 108 above it) having been fully removed/ablated, and is different than color 3. Similar to colors 2 and 3, color 4 is not reflective.

In another aspect, illustrated in FIGS. 4A-C and 5A-C, the upper layer 108 can be removed in spots of varying spacing or density to create a desired pattern or design. In this aspect, the depth of removed material may be held constant, similar to the first depth described above, in which the upper layer 108 is partially removed, thereby still displaying the dark chrome material, but roughened and without reflectivity. Alternatively, the constant depth may be the second depth described above, in which the dark chrome layer 108 is fully removed, thereby displaying the bright chrome of the first layer 106. FIGS. 4A-4C and 5A-5B are in black-and-white line form, and effectively illustrate a negative representation of corresponding photo images shown in corresponding FIGS. 4A1-4C1 and 5A1-5B1.

In either case, the removed sections create a contrast relative to the non-removed sections. The contrast may be defined by a series of dots, lines, circles, or other shapes to expose varying amounts of the underlying chrome layer 108 or 106. The varying amounts of removed material can therefore be used to create various shades between the colors of the chrome materials. This process is similar to the use of black and white color mixing to create various shades of gray depending on the density of the contrast. If a darker color is desired in one area, then a greater amount of the dark color may be present, with a smaller amount of the lighter color being exposed. Similarly, if a lighter shade is desired, a greater amount of the lighter chrome material is exposed, with move of the dark chrome being removed. The "density" of the remaining layer 108 can be controlled by increasing/decreasing the number of spots of a given spot size within a given area (varying the spacing between spot centers), or by increasing the spot size for a given number of spots and a given area (having the spacing between centers). In one aspect, both the spacing of the centers and the size of the spots may be varied to alter the density and therefore the appearance of the surface. FIG. 5B illustrates, for example, an increased number of spots, such that less of the darker layer 108 remains in a given area.

The shaded appearance of the component 100 may be varied across the part, to create a gradient of color, or other desirable designs. Moreover, while spots have been shown to alter the density, other removal patterns may be used with different sizing or spacing to change the amount of relative material between light and dark. For example, a series of parallel lines may be spaced apart at different distances. Similarly, lines may be crossed over each other at different angles or distances.

Figure 3:
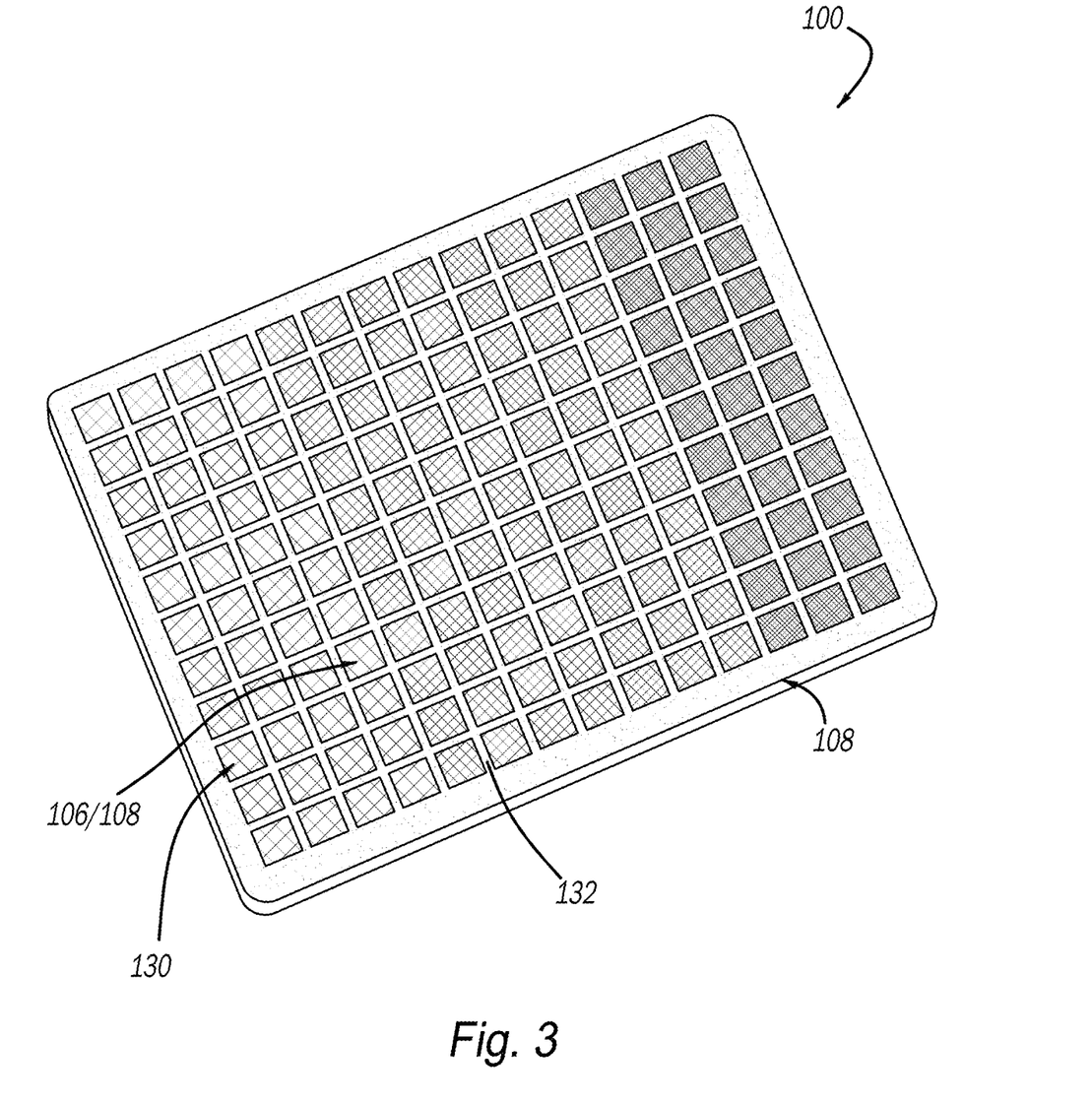
FIG. 3 is a perspective view illustrating a component with different shades of contrasting colors according to an aspect of the disclosure.

FIG. 3 illustrates a component 100 with a plurality of squares 130 arranged in a grid. The shade of the squares of the grid varies across the surface of the component 100. The grid lines 132 are defined by the upper layer 108 of material, and the squares 130 defined between the gridlines are defined by varying the amount and density of material that is removed, such that the squares 130 each include visible layer 106 and 108.

As shown in FIG. 3, in the lower left corner of the image, the squares 130 are brighter relative to the squares 130 in the upper right of the component 100. The squares in the lower left have a greater overall amount of removed material of layer 108 (or percentage of material within a given area), such that more of the bright chrome layer 106 is exposed.

In one aspect, rather than varying the amount of exposed layer 106 relative to layer 108, the density of a matte finish of layer 108 vs. a glossy finish of layer 108 may be controlled to create a variable appearance by removing only a portion of the depth of layer 108. This aspect is also illustrated in FIG. 3 on the right, where the squares 130 show a darker matte finish of material 108 relative to the glossy grid lines of material 108.

Figure 4A:
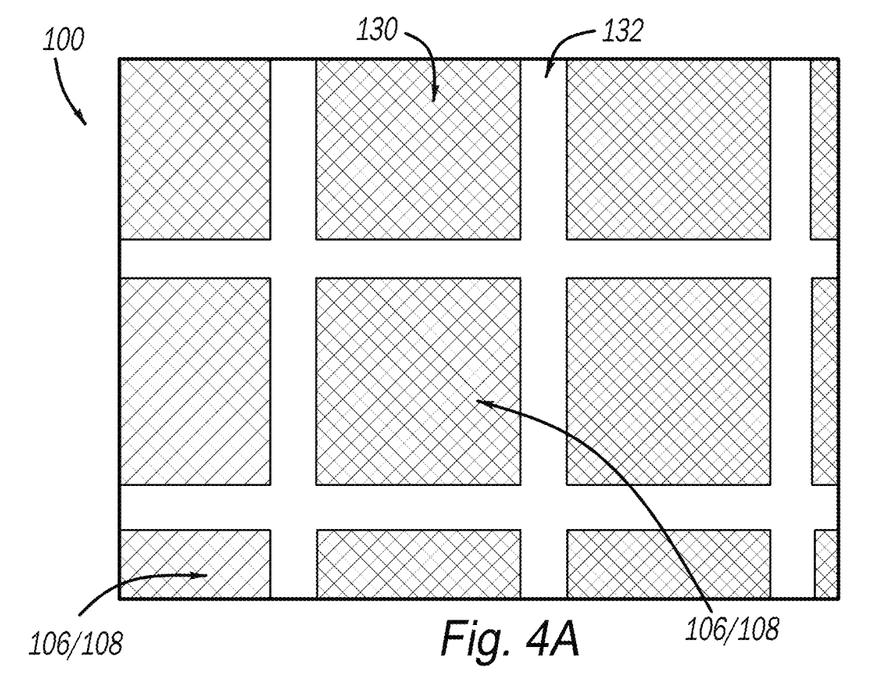
FIGS. 4A-4C illustrate black-and-white line drawing representations of magnified sections of the component of FIG. 3 illustrating further aspects of the disclosure.
Figure 4A:
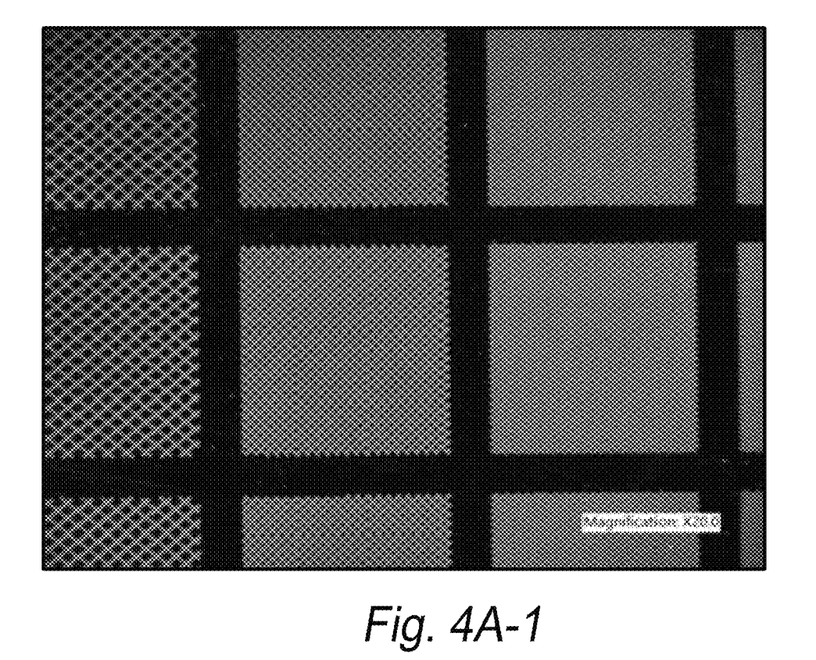
Figure 4B:
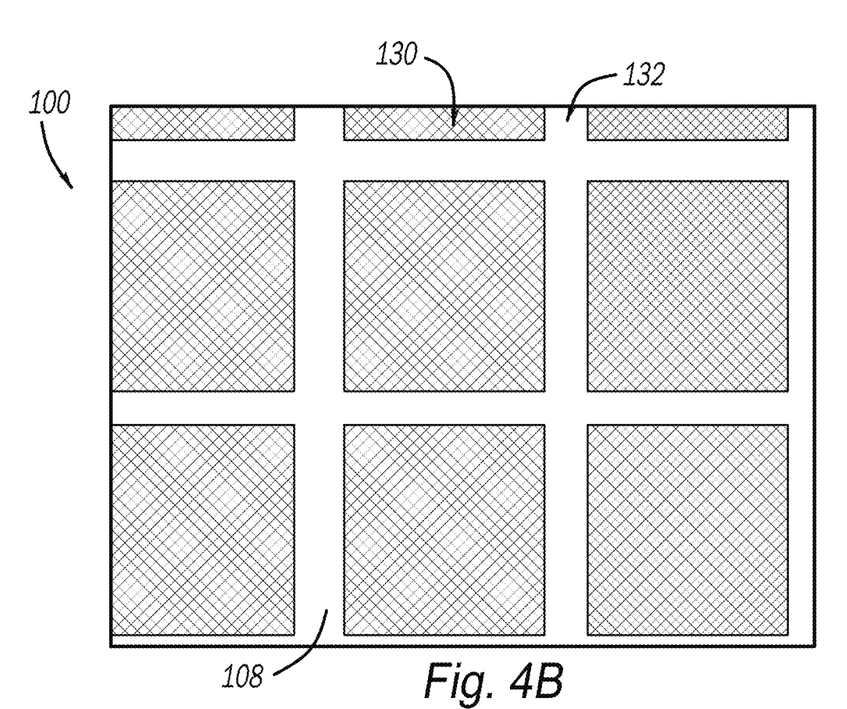
Figure 4B:
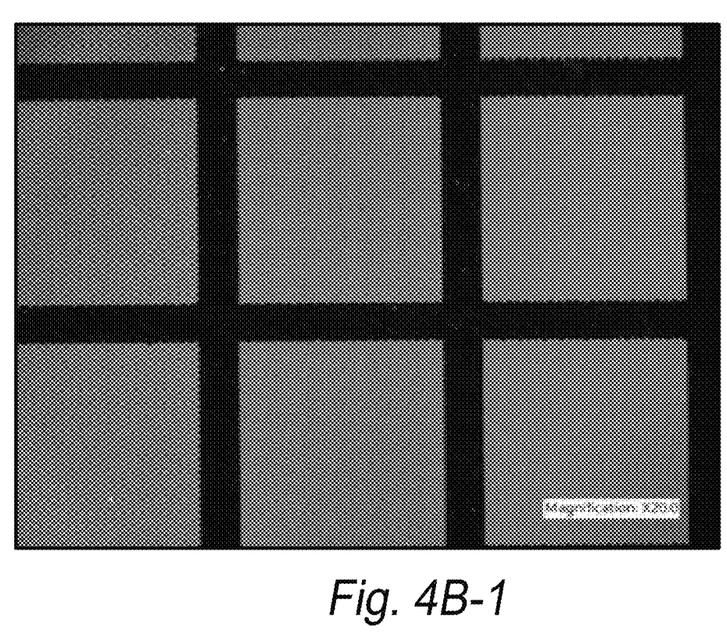
Figure 4C:
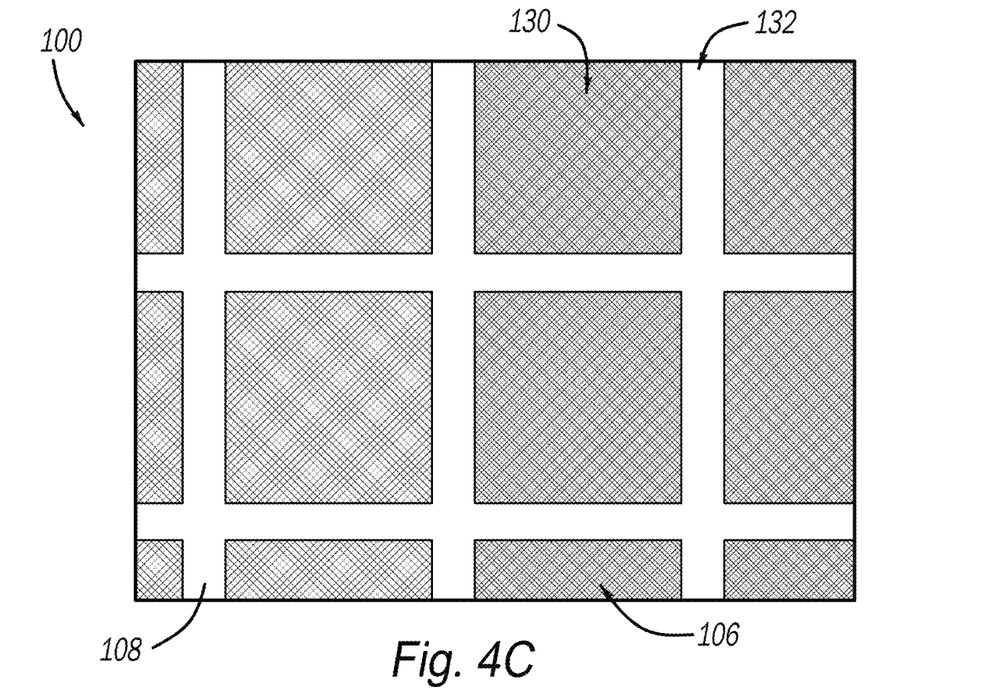
Figure 4C:
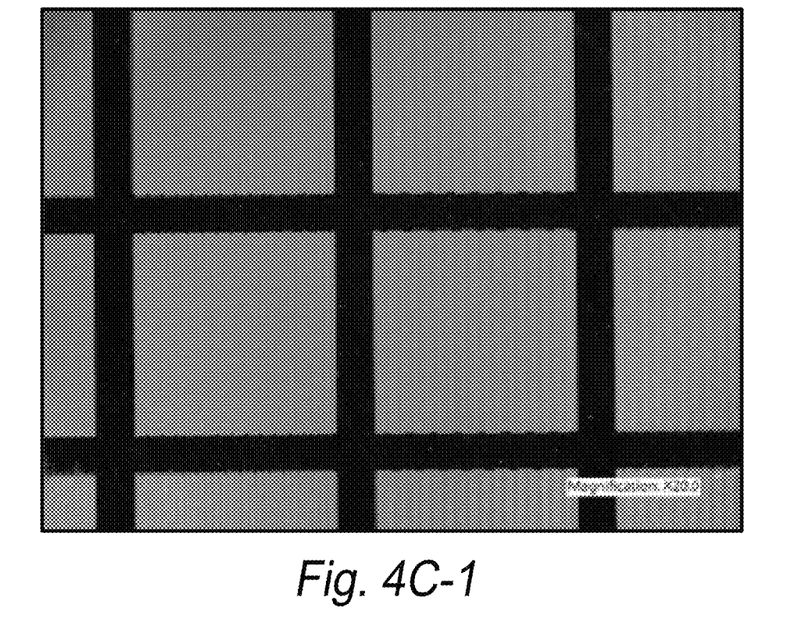

FIGS. 4A-C illustrates enlarged views of selected ones of the squares shown in the grid of FIG. 3, at a 20× magnification. In FIG. 4A, the enlarged views of the squares 130 show the darker squares of FIG. 3, where less material is removed, thereby exposed less of the bright chrome of layer 106 and retaining more of the dark chrome of layer 107. The material of layer 108 may be removed in a series of dots or crossing lines, in one aspect, thereby displaying the brighter underlying layer 106. The squares displayed in FIG. 4B illustrate the lighter shaded squares, where a far greater amount of the bright chrome of layer 106 is exposed by removing more of layer 108. FIG. 4C illustrates all or nearly all of the layer 108 removed in the squares 130.

Figure 5A:
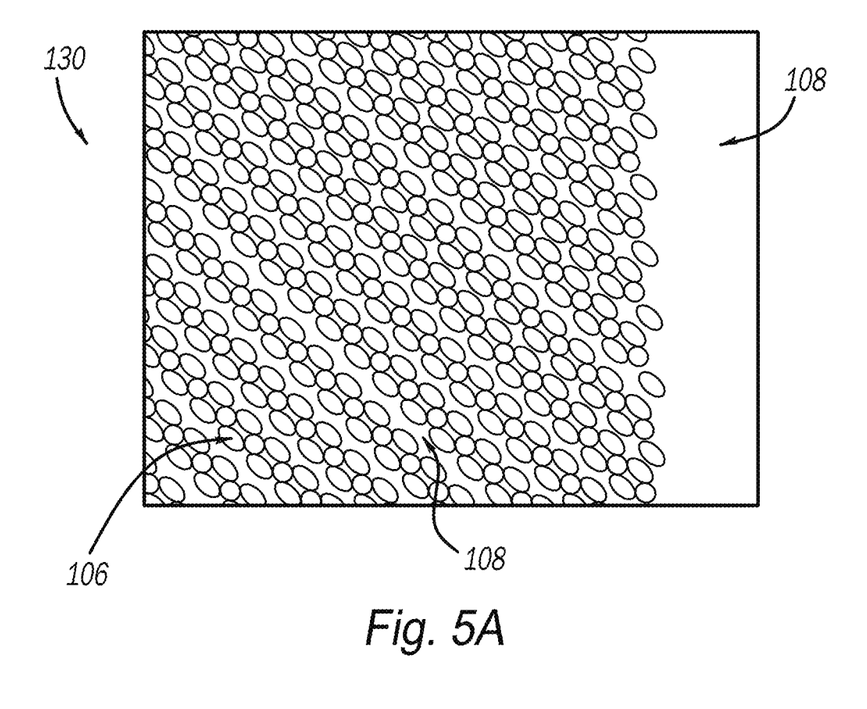
FIGS. 5A-5B illustrate further magnified sections of the component of FIG. 3 illustrating further aspects of the disclosure.
Figure 5A:
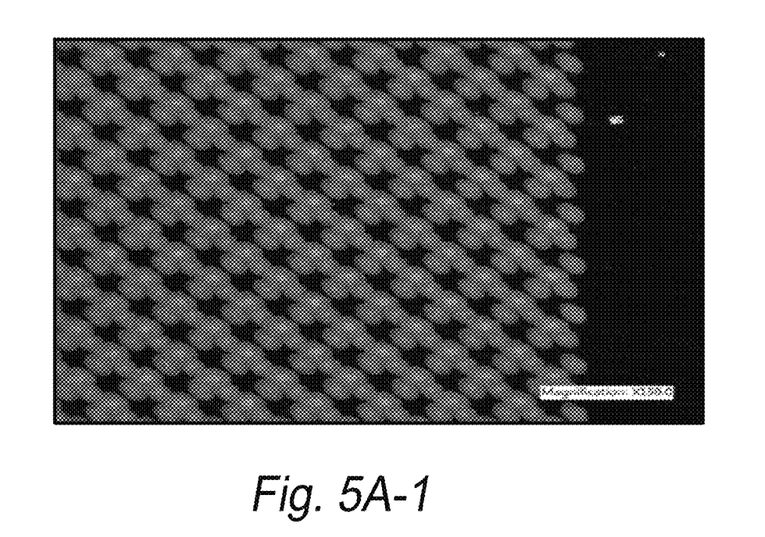
Figure 5B:
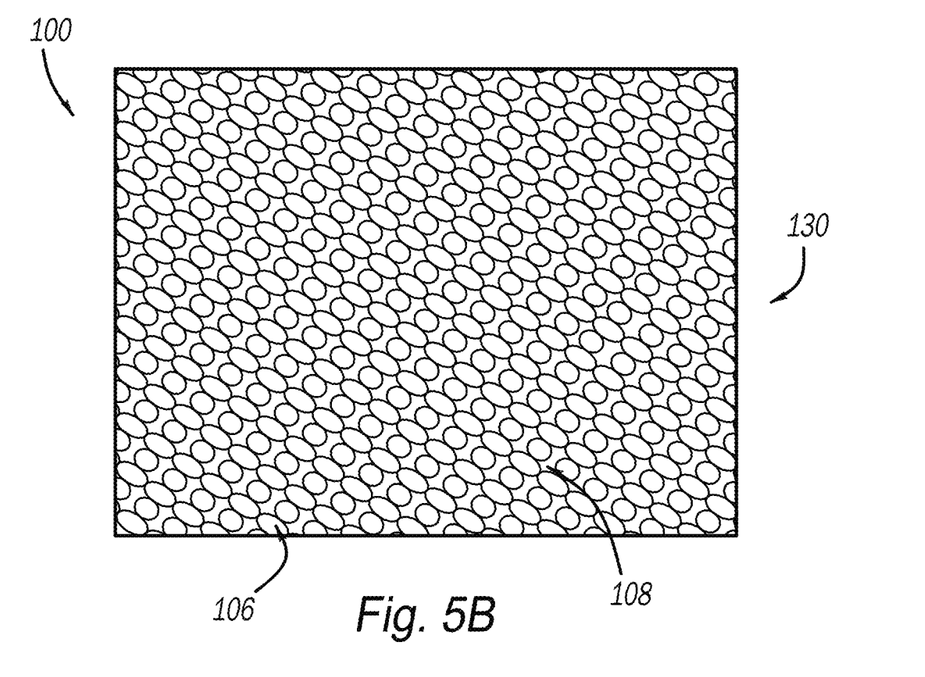
Figure 5B:
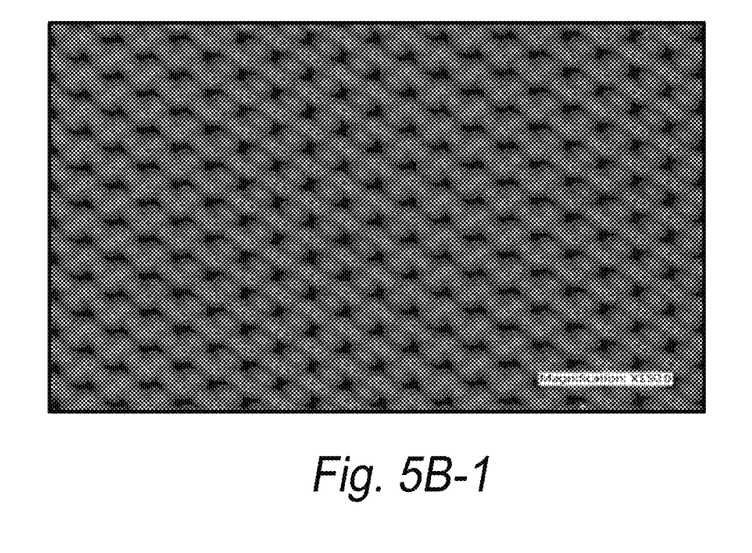

FIGS. 5A and 5B each illustrate yet another enlarged view of the squares, at a magnification of 150×. FIG. 5A shows a greater amount of dark chrome (layer 108) remaining relative to FIG. 5B. FIG. 5B shows more of the dark chrome (layer 108) removed, and therefore more of the bright chrome (layer 106) is visible. Correspondingly, the exposed bright chrome dots are closer together, thereby creating a brighter overall appearance.

Put another way, an increase in spacing of ablated areas corresponds to an increase in remaining dark chrome of layer 108 and a darker appearance. A decrease in spacing corresponds to a decrease in remaining dark chrome of layer 107 and an increase in exposed bright chrome of layer 106, resulting in a lighter appearance.

A complete removal of the dark chrome material fully exposes the bright chrome over a predefined area, such as the squares 130 on the lower left of FIG. 3 and also in FIG. 4C. In this area, the bright chrome of layer 106 is fully exposed. However, due to the ablation, the bright chrome does not appear reflective, and displays a matte finish.

The above described aspect of varying the density of removed material to vary the shade of the two colors of chrome can be combined with varying the depth of ablation. For example, varying the shade by varying the density of removal can be combined with removing the first chrome layer 106 and exposing the nickel layer 104. The density of exposed nickel layer 104 can also be varied in a similar manner.

Figure 6:
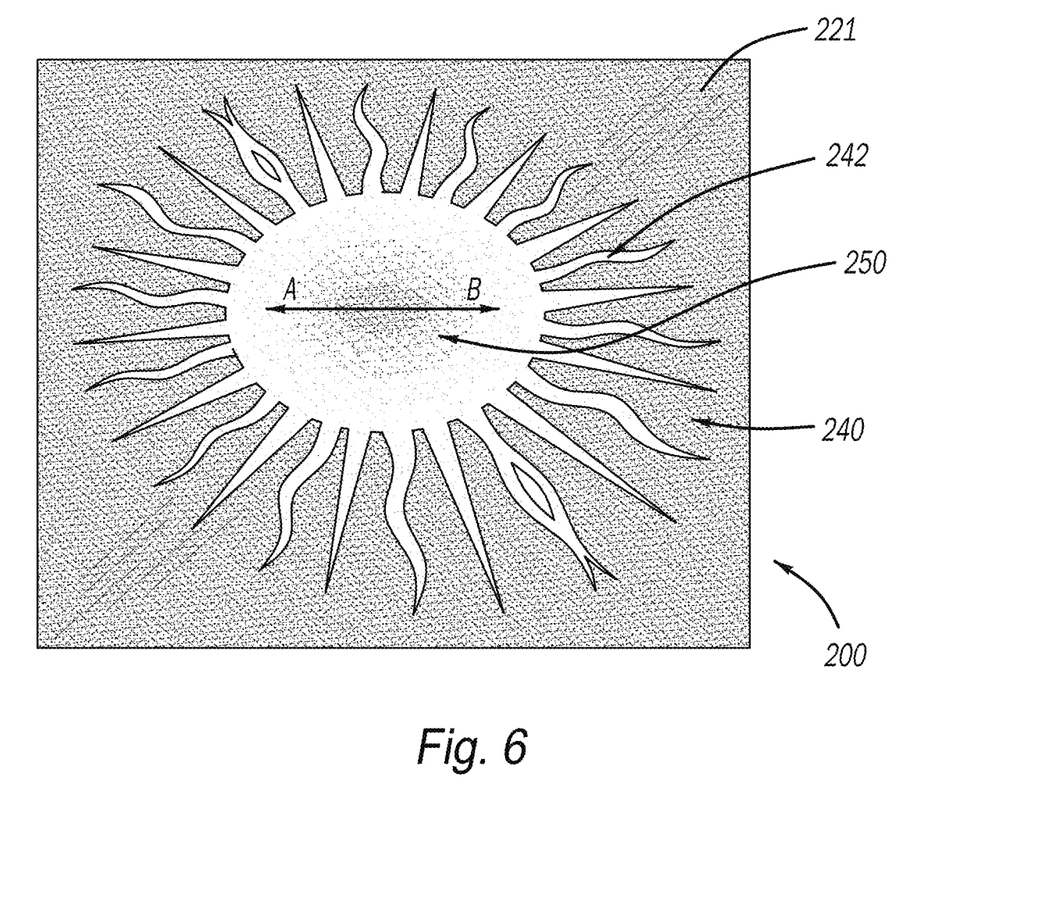
FIG. 6 is a perspective view illustrating another component according to an aspect of the disclosure, including a gradient appearance.
Figure 7:
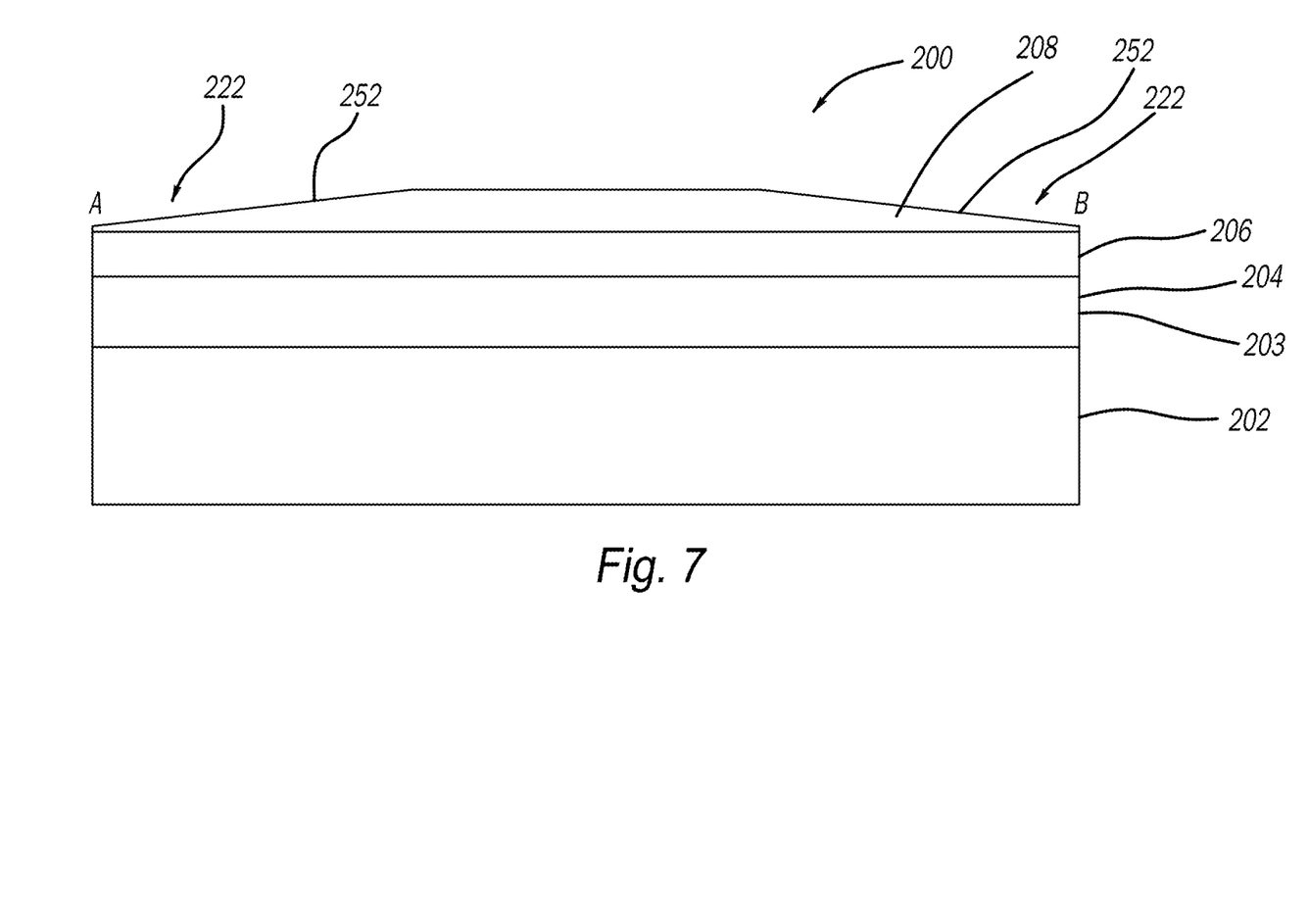
FIG. 7 is a schematic cross-sectional view of the decorative component of FIG. 6 according to an aspect of the disclosure, illustrating a tapered recess.

The variable amount of material that can be removed for the layers, including for the outermost, second layer 108, may be performed in a stepped fashion, with different fixed depths of removal as illustrated in FIG. 1, or may be performed in a "smooth" or gradual fashion, as illustrated in FIGS. 6 and 7. Put another way, the bottom of the recessed area where material is removed may be tapered across the removed area.

FIG. 6 illustrates a component 200 having a similar layer stack-up as component 100, with substrate 202 coated with layers 203, 204, 206, and 208 (similar to layers 103 104, 105, 106, and 108), with second layer 208 being the outermost layer. Layer 208 may be dark chrome, with layer 106 bright chrome. A laterally outer portion or area 221 may have the appearance of layer 208 and dark chrome. FIG. 6 illustrates a pattern 240 having radially projecting sections 242 extending from a central area 250, and the sections 242 may have the appearance of layer 206, with the layer 208 being completely removed in these areas. Removal of material in the central area 250 is performed gradually in a radial direction in this example, creating a gradient effect based on the smooth transition between the outermost surface of layer 208 toward the layer 206.

As shown in FIG. 7, the transition from the top of layer 208 down to layer 206 is sloped or tapered, and defines a bottom surface 252 of recess 222. As shown the slope is constant or fixed. However, it will be appreciated that this slope could be variable, such as illustrating a convex, concave, or combined complex and concave curve in cross-section. In the middle of central area 250, the layer 208 may have its entire thickness, similar to outer area 221, which may be the darkest area due to the full layer of dark chrome in this example. It will be appreciated that this is one example, and the highest or thickness portion of layer 208 in the pattern may be located elsewhere, being offset from center, or having an annular shape, or defining text or some other design other than the illustrate "sun-and-ray" example. FIG. 7 illustrates the variable thickness of layer 208 along line A-B of FIG. 6. The thicknesses of other layers are not to scale.

Moving from the center of area 250 outwardly results in a smooth transition of thickness, with the thickness of layer 208 being gradually reduced further from center. With less material of layer 208 at different lateral locations, a different outer appearance is defined at different lateral locations due to the different amount of material between the outermost surface and the underlying layer 106. It will be appreciated that the center of the pattern defined by the recess 222 may be low rather than high, and that the tapered surface 252 could gradually raise to the outermost surface of layer 208.

If the first layer 206 is exposed in the center of the pattern, then the center will appear different than the outer area 221, gradually transitioning into the color of the outer area defined by layer 208.

The resulting gradient finish caused by the sloped bottom surface 252 of the recess 222 may be dependent on the viewing angle of the gradient pattern. For example, when viewed from above, the amount of remaining material in the viewing direction corresponds to the thickness of the material remaining. However, when viewing the gradient area from a transverse or oblique angle, the amount of material may increase or decrease. Similarly, areas laterally offset from the viewing location may appear differently. Moving the viewing location or tilting the component relative to the viewer thereby causes the appearance of this section to change, creating a dynamic appearance.

To create the variable depth of the recess along the workpiece, the laser or other material removal tool may be moved vertically relative to the workpiece to remove different amounts of material in a lateral direction. Put another way, the amount that the laser penetrates to remove the material may change relative to the top surface, thereby creating a variable depth of the recess 222. The laser or other removal tool may be the component that moves vertically, or the workpiece itself may be moved relative to the position of the laser or other tool. This relative vertical movement may be combined with relative lateral movement during the removal process to create the tapered bottom surface 252. The direction of removal may be in the form of in a spiraling or circular pattern to gradually remove material and create the variable depth of the recess, or the direction of removal may be generally linear. For example, in the case of a laser, the laser may move back and forth as the depth of the recess created by the laser varies. The removal path may be dependent on the desired shape of the pattern to be created.

The recess 222 where material is removed in a gradual manner to define the gradient appearance may be referred to a sloped area, but it will be appreciated that such a reference is not limited to constant slopes, and such reference shall be interpreted as also including curved surface contours, wavy surface contours, and the like. The material does not need to be reduced only along a radial/lateral direction. The gradual material thickness may both increase and decrease depending on the desired design.

In another aspect, the above described dual chrome layer finishes of component 100 and/or 200, and the selective removal or material, may be combined with traditional mechanical abrasion techniques, like brushing. Reference will be made to component 100, but this discussion also applies to component 200. In this aspect, the upper layer 108 of chrome (or other material) may be removed (entirely or selectively) via brushing, exposing the underlying first chrome layer 106, which is a different color, but without necessarily exposing the underlying nickel layer 104. This approach is advantageous relative to traditional brushing of traditional single layer decorative finishes, because this approach does not later require a sealing or topcoat to prevent corrosion and skin touch issues that can occur on exposed nickel. Thus, the dual chrome layers described above, when combined with traditional mechanical abrasion, provides time savings and cost savings by eliminating the need for applying the topcoat.

In yet another aspect, the dual-chrome layer arrangement described herein can be created through the use of masking techniques as an alternative to or in addition to the laser ablation described herein. For example, masking may be used in areas where the upper layer is intended to not be present, while laser ablation can be used for more detailed areas to create intricate or detailed removal patterns, or to alter the thickness of material such as by using tapered recessed areas for gradual material thickness.

In this aspect, masking may be applied after depositing the first chrome layer 106 ad prior to depositing the second chrome layer 108. For example, the mask may be disposed in an area corresponding to the recess at color 3 of FIG. 1, for example, such that the layer 108 is not deposited over this area. Thus, the material of layer 108 would not need to be removed because it was not applied.

The mask that is applied over the first chrome layer 106 prevents deposition of the second layer 108 over the masked area. In the case of electrodeposition, the component 100 can be removed from the plating line, with the mask applied, and the component 100 thereafter replaced into a plating bath. After depositing the second layer 108 in the non-masked areas, the mask can thereafter be removed.

Traditional masking requirements associated with electroplating are not necessary in such a process, because the first chrome layer 106 has already been applied fully over the nickel layer 104. The mask therefore only has to last through the plating of the second chrome layer 108. Accordingly, the mask does not undergo the highly oxidizing conditions of a chrome-sulfuric etch process that is used to roughen the surface of the plateable plastic substrate 102 that is performed in a typical electroplating process (which is performed to make the plastic hydrophilic in the pre-plate steps of the traditional plating on plastic process). For those reasons, the use masking for a plating on plastic process is typically undesirable, but in this case, plating on plastic may still be performed, and masking may be used prior to the final plating step to achieve a desired multi-color design, at least in part.

Masking may be applied in one of a variety of methods, such as applying mask coatings via dip, spray, or immersion. Other approaches includes transfer decals, ink jet coatings, or thermal transfer. It will be appreciated that the possible masking processes are not limited to those listed herein. In one aspect, intricate graphic designs may be created through the application of a photolithographic coating followed by exposure and development.

After the component 100 (or 200) has completed the electrodeposition and/or vapor deposition of the two chrome layers 106, 108, the masking agent used can be removed via known processes including, but not limited to, swelling in an organic solution, application heat, high pressure water or steam, or a combination of these or other steps.

The use of masking to selectively deposit the second chrome layer 108 provides the advantage of not creating surface roughness from ablation. Accordingly, the underlying first chrome layer 106 may appear reflective, in addition to the reflective appearance of second chrome layer 108. Ablation may be used on the reflective first chrome layer 106 in select areas, in a manner similar to that described above with respect to removing a portion of the thickness of layer 108.

Masking may be used in addition to laser ablation and mechanical ablation and other processes described herein, to provide further variety in the final appearance of the component 100 or 200.

The above discussion has focused primarily on material deposition via electrodeposition or electroplating. However, as discussed above, the first and second layers 106, 108 may also be deposited on the component 100 via vapor deposition, and layers deposited via vapor deposition shall not be interpreted to be excluded from the scope of this disclosure.

Indeed, the use of vapor deposition provides additional benefits in some cases. In one aspect, vapor deposition provides a wider range of colors that are available by depositing various metals or metal alloys over an underlying decorative layer. Accordingly, additional attractive designs and colors on parts that are not presently achievable according to current automotive industry practices can be enabled through the use of the vapor deposition process. The above-described process of using select ablation of different depths to expose select portions or differing thickness of material may therefore be applicable to vapor deposited layers and other types of deposited layers.

Accordingly, the component 100 may be achieved via the deposition of metal layers via electrodeposition and/or vapor deposition. Selective removal of material of the multiple metal layers can be performed to create different colors on the component 100, and the size and density of removed portions, as well as varying the depth either sloped gradually and/or at different locations, can be selected to adjust the shade and appearance of the combined colors of the layers. Portions may be removed via laser ablation or mechanical techniques such as brushing. Additionally, selective deposition may be performed through the use of masking, by limiting the areas of the underlying layers that are exposed to deposition. The masking agent is applicable after deposition of an initial decorative layer, and therefore can be used without the same masking requirements for typical plating on plastic processes. The masking agent may be optionally removed after the depositions are complete.

It will be appreciated that various aspects disclosed above may be combined with each other, as well with established systems and methods. The above description and embodiments disclosed herein are for illustrative purposes and to provide context for the current invention, but shall not be interpreted as limiting the scope of the invention as set forth in the following claims.

What is claimed is:

1. A decorative component comprising:
   a substrate formed from a plateable material;
   a plurality of metal sub-layers deposited on the substrate;
   a first decorative metal layer deposited on the plurality of metal sub layers, the first decorative metal layer having a first color;
   a second decorative metal layer deposited on the first decorative metal layer, the second decorative metal layer having a second color that is different than the first color, wherein the second decorative metal layer defines an outermost surface of the decorative component;
   a first recess formed in the second decorative metal layer, the first recess having a first depth relative to the outermost surface and extending at least fully through the second decorative metal layer and exposing the first decorative metal layer;
   wherein the outermost surface of the second decorative metal layer has a first finish, and the first recess defines a second finish that is different than the first finish;
   wherein the first decorative metal layer has a first chrome finish;
   wherein the second decorative metal layer has a second chrome finish that is different than the first chrome finish.

2. The decorative component of claim 1, wherein the first recess further extends partially into the first decorative metal layer.

3. The decorative component of claim 2, wherein the first recess extending fully through the second decorative metal layer exposes the first decorative metal layer, wherein the first finish and the second finish are both reflective.

4. The decorative component of claim 1, wherein the first finish of the second decorative metal layer is a reflective finish, and the second finish of the first recess is a non-reflective finish.

5. The decorative component of claim 1 further comprising a second recess formed in the second decorative metal layer, wherein the second recess extends into the second decorative metal layer and less than fully through the second decorative metal layer,
   wherein the first finish of the outermost surface of the second decorative metal layer corresponds to a color of the second decorative metal layer, and the second finish of the first recess corresponds to a color of the first decorative metal layer, and the second recess defines a third finish corresponding to the color of the second decorative metal layer, wherein the first finish of outermost surface is reflective and the third finish of the second recess is non-reflective.

6. The decorative component of claim 5, further comprising a third recess extending fully through the second decorative metal layer, the first decorative metal layer, and at least reaching a nickel layer of the plurality of metal sub-layers and exposing the nickel layer, wherein four finishes are defined by the outermost surface, a recessed surface of the second decorative metal layer, the first decorative metal layer, and the nickel layer.

7. The decorative component of claim 1, wherein the first recess is one of a plurality of recesses spaced apart from each other and disposed across a shaded portion of the outermost surface, wherein the plurality of recesses define a stippled finish in the shaded portion that includes both the first finish and the second finish, wherein the stippled finish varies based on the spacing of the plurality of recesses relative to each other.

8. The decorative component of claim 1, wherein the substrate is a plastic substrate formed of a plateable resin.

9. The decorative component of claim 1, wherein the first recess extends into the second decorative metal layer gradually and at a variable depth across the first recess to define a sloped bottom surface of the recess, the sloped bottom surface defined by remaining material of the second decorative metal layer, and a thickness of the remaining material of the second decorative metal layer varies across the first recess, wherein the second finish is a gradient finish, wherein the variable depth includes a portion that it is at least fully through the second decorative metal layer such that the first decorative metal layer is exposed.

10. A method of creating the decorative component of claim 1 having multiple colors, the method comprising the steps of:
    providing the plateable substrate;
    depositing the plurality of sub-layers on the plateable substrate;
    depositing the first decorative metal layer on the plurality of sub-layers;
    depositing the second decorative metal layer on the first decorative metal layer, wherein the second decorative metal layer defines the outermost surface of the decorative component, the outermost surface having the first finish;
    defining the first recess in the second decorative metal layer that defines the second finish.

11. The method of claim 10, wherein the first and second decorative metal layers are deposited via electroplating and/or vapor deposition.

12. The method of claim 10, wherein the first recess is defined by selectively removing material of the second decorative metal layer via laser ablation.

13. The method of claim 10, wherein the first recess is defined by selectively depositing the second decorative metal layer and leaving the first decorative metal layer exposed.

14. The method of claim 10, wherein the method further includes defining a second recess that extends into the second decorative metal layer and less than fully through the second decorative metal layer and defines a different finish of the second decorative metal layer relative to the outermost surface.

15. The method claim 10, wherein the first recess is defined by mechanical abrasion.

16. The method of claim 10, wherein the first and second finishes are different colors and no protective topcoat is applied over the component.

17. The method of claim 10, wherein the first finish is reflective, and the second finish is reflective or non-reflective.

18. The method of claim 10, wherein the first recess extends into the second decorative metal layer gradually and at a variable depth across the first recess to define a sloped bottom surface of the recess, the sloped bottom surface defined by remaining material of the second decorative metal layer, and a thickness of the remaining material of the second decorative metal layer varies across the first recess, wherein the second finish is a gradient finish, wherein the variable depth includes a portion that it is at least fully through the second decorative metal layer such that the first decorative metal layer is exposed.

19. The method of claim 10, wherein the plateable substrate is a plastic substrate formed of a plateable resin.

20. A decorative component comprising:
a substrate formed from a plateable material;
a plurality of metal sub-layers deposited on the substrate;
a first decorative metal layer deposited on the plurality of metal sub layers, the first decorative metal layer having a first color;
a second decorative metal layer deposited on the first decorative metal layer, the second decorative metal layer having a second color that is different than the first color, wherein the second decorative metal layer defines an outermost surface of the decorative component;
a first recess formed in the second decorative metal layer, the first recess having a first depth relative to the outermost surface and exposing the first decorative metal layer;
wherein the outermost surface of the second decorative metal layer has a first appearance, and the first recess defines a second appearance that is different than the first appearance;
wherein the first decorative metal layer is bright chrome and the second decorative metal layer is dark chrome.

21. A decorative component comprising:
a substrate formed from a plateable material;
a plurality of metal sub-layers deposited on the substrate;
a first decorative metal layer deposited on the plurality of metal sub layers, the first decorative metal layer being chrome and having a first color;
a second decorative metal layer deposited on the first decorative metal layer, the second decorative metal layer being chrome and having a second color that is different than the first color, wherein the second decorative metal layer defines an outermost surface of the decorative component;
a first recess formed in the second decorative metal layer, the first recess having a first depth extending fully through the second decorative metal layer and exposing the first color of the first decorative metal layer;
wherein the outermost surface of the second decorative metal layer has a first chrome finish, and the first recess defines a second chrome finish that is different than the first chrome finish;
a second recess formed in the second decorative metal layer, wherein the second recess extends into the second decorative metal layer and less than fully through the second decorative metal layer and exposes the second color of the second decorative metal layer and defines a third finish;
wherein the first finish of the outermost surface of the second decorative metal layer differs from the second finish defined by the first recess and the third finish defined by the second recess.

* * * * *